(12) United States Patent
Huang

(10) Patent No.: US 6,269,738 B1
(45) Date of Patent: Aug. 7, 2001

(54) GRILL DEVICE

(76) Inventor: Olivia Huang, No. 2, Lane 403, Sec. 3, Chung-Shan Rd., Wu-Tze Hsiang, Taichung Hsien (TW)

( * ) Notice: Subject to any disclaimer, the term of this patent is extended or adjusted under 35 U.S.C. 154(b) by 0 days.

(21) Appl. No.: 09/619,210

(22) Filed: Jul. 19, 2000

(51) Int. Cl.$^7$ .................................................. A47J 37/06
(52) U.S. Cl. .............................. 99/375; 99/380; 99/372; 99/445
(58) Field of Search ........................... 99/372, 375, 376, 99/377, 379, 380, 349, 389, 390, 391, 400, 445, 446; 219/524, 525

(56) References Cited

U.S. PATENT DOCUMENTS 264,867 * 9/1882 Ege .......................................... 99/375
5,845,562 * 12/1998 Deni et al. ............................... 99/375

* cited by examiner

Primary Examiner—Reginald L. Alexander
(74) Attorney, Agent, or Firm—Trop, Pruner & Hu, P.C.

(57) ABSTRACT

A grill device includes an annular bottom wall adapted to be placed above a flat support, and outer and inner annular walls which extend uprightly from outer and inner annular peripheries of the bottom wall to form outer and inner upper annular edges and which cooperate with the bottom wall to confine an annular fluid collecting groove. A lower cooking member includes upper and lower major walls normal to a central line. The upper major wall includes an outer circumferential area integrally formed with and extending inwardly from the upper inner annular edge, and a central area that is raised so as to be higher than the outer circumferential area. The lower major wall is punched upwardly to form a plurality of first and second ridge portions respectively in the central and outer circumferential areas. The first and second ridge portions are of such heights so that the respective first ridge portion is not higher than the respective second ridge portion. An upper cooking member is disposed to be hinged to the lower cooking member so as to cover and be superimposed on the lower cooking member. Therefore, meat disposed on the first and second ridge portions can be held in position even when the upper cooking member is in an open position relative to the lower cooking member.

5 Claims, 6 Drawing Sheets

GRILL DEVICE

BACKGROUND OF THE INVENTION

1. Field of the Invention

This invention relates to a grill device, more particularly to a grill device for cooking meat, fish, poultry, and the like.

2. Description of the Related Art

Referring to FIGS. 1 and 2, a conventional grill device is shown to include a base unit 4 and an upper unit 3 which is hinged to the base unit 4 along a pivot axis.

The base and upper units 4,3 respectively have lower and upper cooking plates 2,1 which have a plurality of rib portions 202,102 mounted in heat conducting relationship for retaining food in position when the upper unit 3 is moved to a closed position where the upper unit 3 is superimposed upon the base unit 4.

The lower cooking plate 2 has a plate surface 201 which inclines gradually and downwardly from a proximate position relative to the pivot axis toward a distal position, and which is formed with a fluid outlet 206 that is disposed at the distal position for draining liquid from the lower cooking plate 2 outwardly. The base unit 4 further has an upright peripheral wall 205 confining the periphery of the lower cooking plate 2. When meat 5 is disposed on the rib portions 202 for grilling, liquid dripping from the lower cooking plate 2 will flow through the fluid outlet 206 and a through hole 401 formed in the base unit 4 into an accumulating tray 402.

However, the conventional grill device cannot be used when the upper unit 3 is in an open position relative to the base unit 4 since the meat 5 disposed on the rib portions 202 may slide toward the distal position due to the gradually inclined plate surface 201.

SUMMARY OF THE INVENTION

The object of the present invention is to provide a grill device which can be used in closed and open positions, and where liquid is effectively collected and can be conveniently disposed after the grilling operation.

According to this invention, the grilling device includes an annular bottom wall which is adapted to be placed above a flat support, and which includes first outer and inner annular peripheries opposed to each other and surrounding a central line. An outer annular wall extends uprightly from the first outer annular periphery and in a transverse direction to form an outer upper annular edge distal to the first outer annular periphery and with a first height. An inner annular wall extends uprightly from the first inner annular periphery and in the transverse direction to form an inner upper annular edge distal to the first inner annular periphery and with a second height which is lower than the first height. The inner annular wall, the outer annular wall and the annular bottom wall confine an annular fluid collecting groove there among. A lower cooking member includes upper and lower major walls normal to the central line and opposite to each other in the transverse direction. The upper major wall includes an outer circumferential area which surrounds the central line and which is integrally formed with and which extends inwardly and towards the central line from the upper inner annular edge to form an inner annular boundary line that is proximate to and that surrounds the central line, and a central area which is disposed to have the central line passing therethrough, which is normal to the central line, and which includes an outer annular boundary line that is distal to the central line and that is coincident with the inner annular boundary line. The central area is raised so as to be higher than the outer circumferential area. The lower major wall is punched upwardly and in the transverse direction to form a plurality of first and second ridge portions respectively in the central and outer circumferential areas. The first and second ridge portions are of such heights in the transverse direction so that along a respective one of a plurality of radial directions, the respective one of the first ridge portions is not higher than the respective one of the second ridge portions. An upper cooking member is disposed to be hinged to the lower cooking member so as to cover and be superimposed on the lower cooking member. Therefore, meat disposed on the first and second ridge portions can be held in position even when the upper cooking member is in an open position relative to the lower cooking member. Due to the different heights of the central and outer circumferential areas, liquid dripping from the lower cooking member can flow into the annular fluid collecting groove so to be effectively collected and conveniently disposed after the grilling operation.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
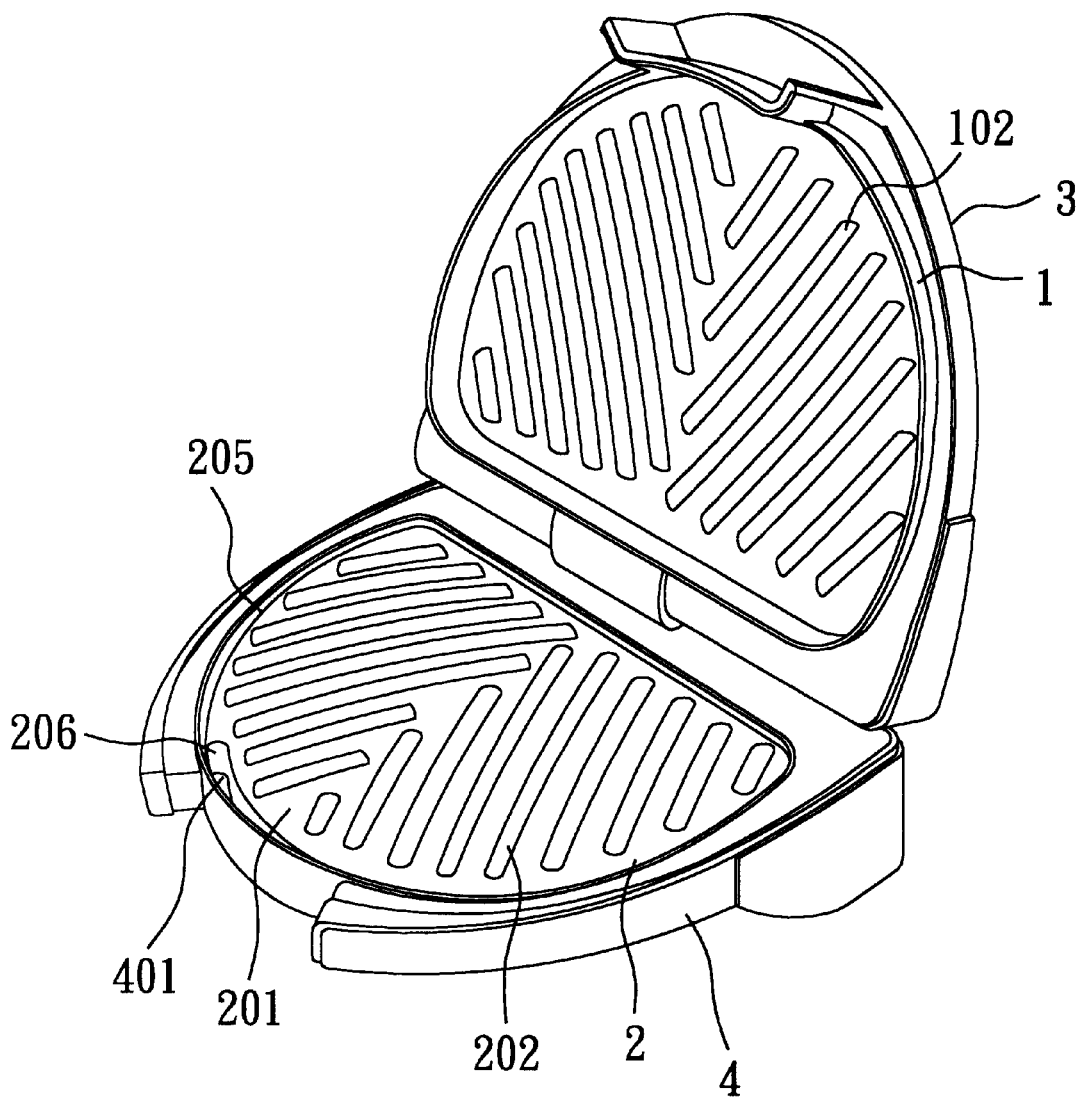
FIG. 1 is a perspective view of a conventional grill device.
Figure 2:
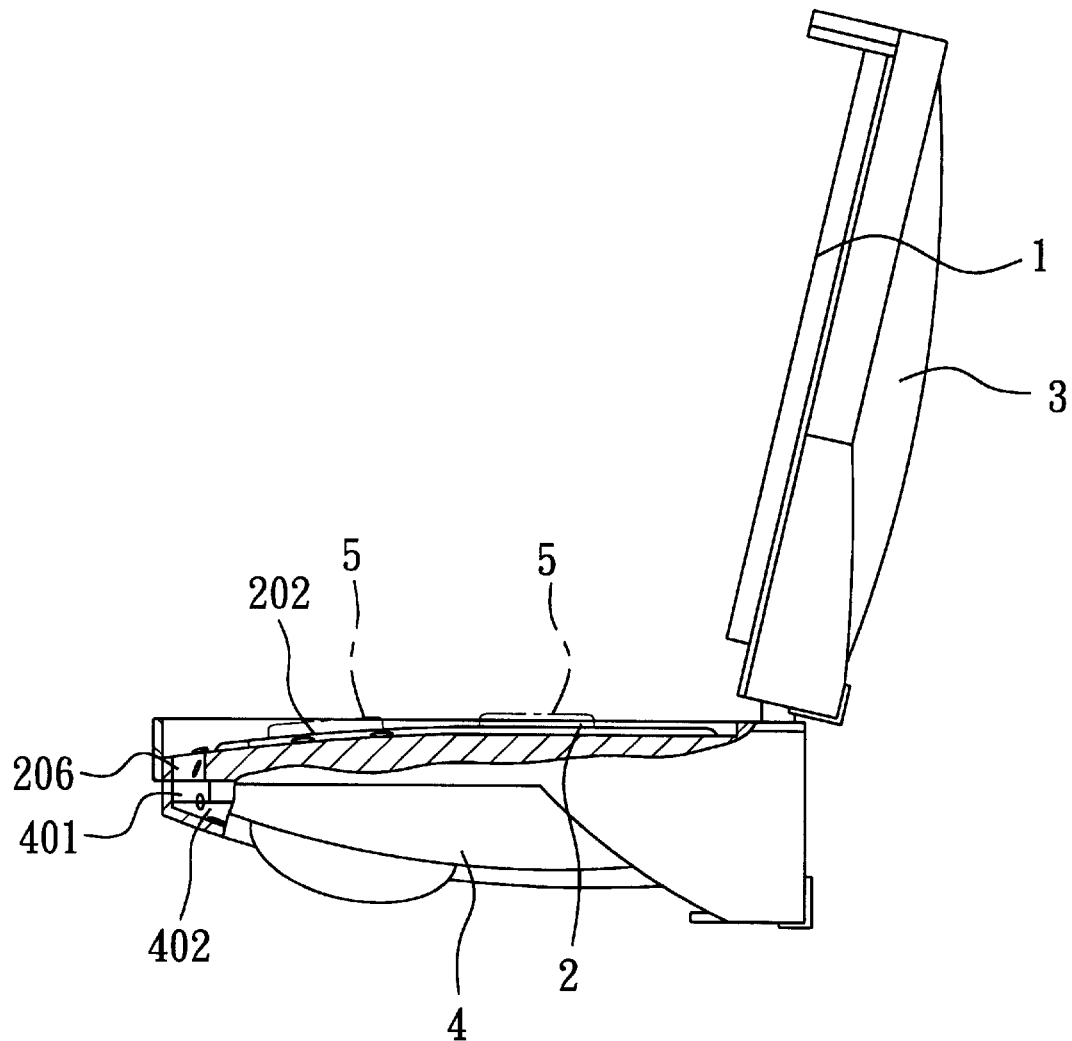
FIG. 2 is a partly sectioned schematic side view of the conventional grill device.
Figure 3:
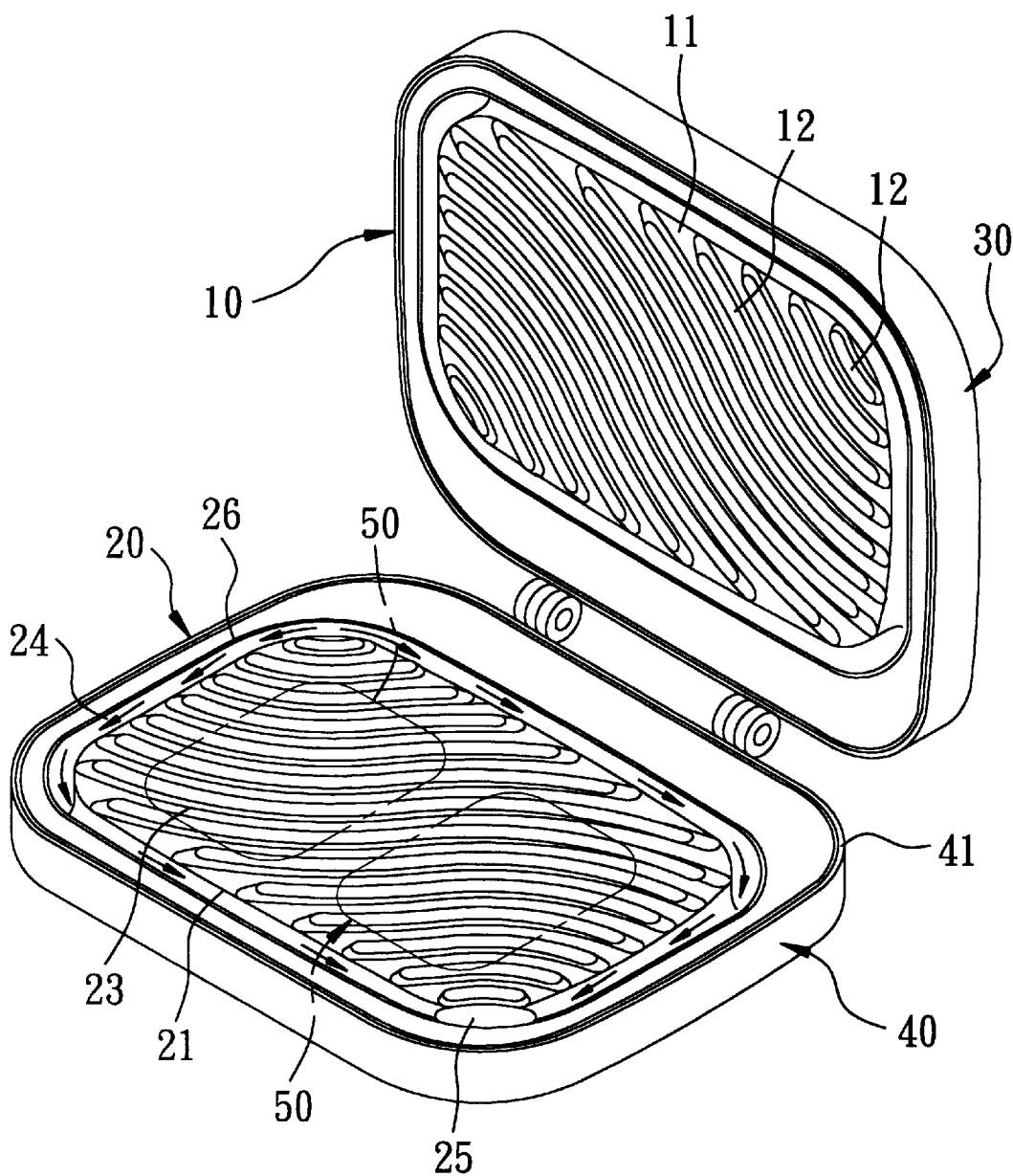
FIG. 3 is a perspective view of a preferred embodiment of a grill device according to this invention.
Figure 4:
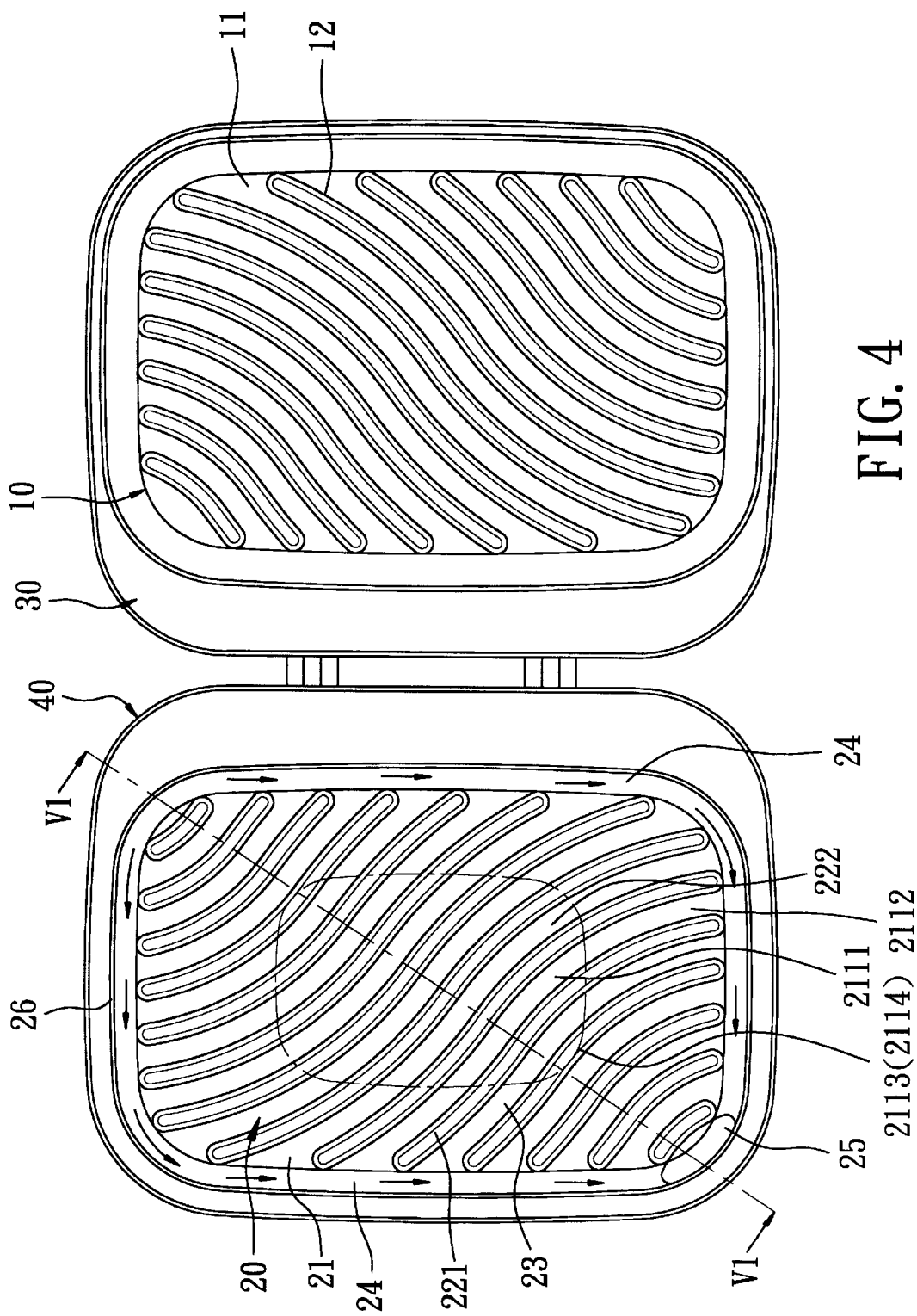
FIG. 4 is a top view of the preferred embodiment.
Figure 5:
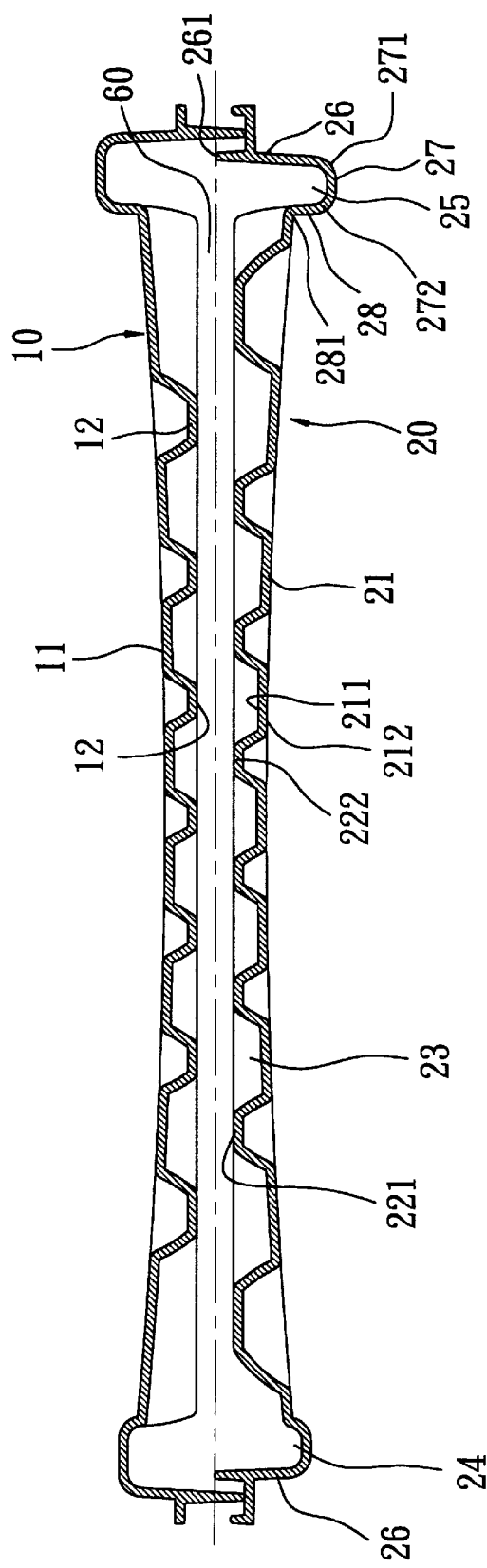
FIG. 5 is a sectional view of the preferred embodiment.

Referring to FIGS. 3, 4 and 5, the preferred embodiment of the grill device according to the present invention is shown to comprise a base unit 40 and an upper unit 30.

The base unit 40 has an annular flat support 41, and includes a lower cooking plate 20 which is placed on the flat support 41. With reference to FIG. 5, the lower cooking plate 20 includes an annular bottom wall 27 having first outer and inner annular peripheries 271,272 that are opposed to each other and that surround a central line. An outer annular wall 26 extends uprightly from the first outer annular periphery 271 and in a transverse direction to form an outer upper annular edge 261 distal to the first outer annular periphery 271 and with a first height. An inner annular wall 28 extends uprightly from the first inner annular periphery 272 and in the transverse direction to form an inner upper annular edge 281 distal to the first inner annular periphery 272 and with a second height which is lower than the first height of the outer upper annular edge 261. The inner annular wall 28, the outer annular wall 26 and the annular bottom wall 27 confine an annular fluid collecting groove 24 there among. The annular bottom wall 27 further has a drainage hole 25 which is formed therein and in fluid communication with the annular fluid collecting groove 24. The drainage hole 25 is disposed lower than the annular fluid collecting groove 24.

A lower cooking member 21 includes upper and lower major walls 211,212 normal to the central line and opposite to each other in the transverse direction. As shown in FIG.

4, the upper major wall 211 includes an outer circumferential area 2112 which surrounds the central line and which is integrally formed with and which extends inwardly and towards the central line from the upper inner annular edge 281 to form an inner annular boundary line 2113 that is proximate to and that surrounds the central line, and a central area 2111 which is disposed to have the central line passing therethrough, which is normal to the central line, and which includes outer annular boundary line 2114 that is distal to the central line and that is coincident with the inner annular boundary line 2113. The central area 2111 is raised so as to be higher than the outer circumferential area 2112. Preferably, in this embodiment, the upper major wall 211 of the lower cooking member 21 is gradually raised from the upper inner annular edge 281 to the center line, i.e. from the outer circumferential area 2112 to the central area 2111.

Moreover, as shown in FIGS. 4 and 5, the lower major wall 212 of the lower cooking member 21 is punched upwardly and in the transverse direction to form a plurality of first and second ridge portions 222,221 respectively in the central and outer circumferential areas 2111,2112. The first and second ridge portions 222,221 are of such heights in the transverse direction so that along a respective one of a plurality of radial directions, the respective one of the first ridge portions 222 is not higher than the respective one of the second ridge portions 221. In this preferred embodiment, the first and second ridge portions 222,221 are of the same height in the transverse direction.

The upper unit 30 is disposed to be hinged to the base unit 40, and includes an upper cooking member 10 to cover and to be superimposed on the lower cooking plate 20. The upper cooking member 10 has an upper cooking plate portion 11 which is movable relative to the lower cooking member 21 to a closed position, wherein the upper unit 30 is superimposed upon the base unit 40, to define a cooking chamber 60 therebetween. The upper cooking plate portion 11 has a plurality of rib portions 12 which are formed thereon and which cooperate with the first and second ridge portions 222,221 to position food to stay on the grill device when the upper cooking plate portion 11 is in the closed position.

Figure 6:
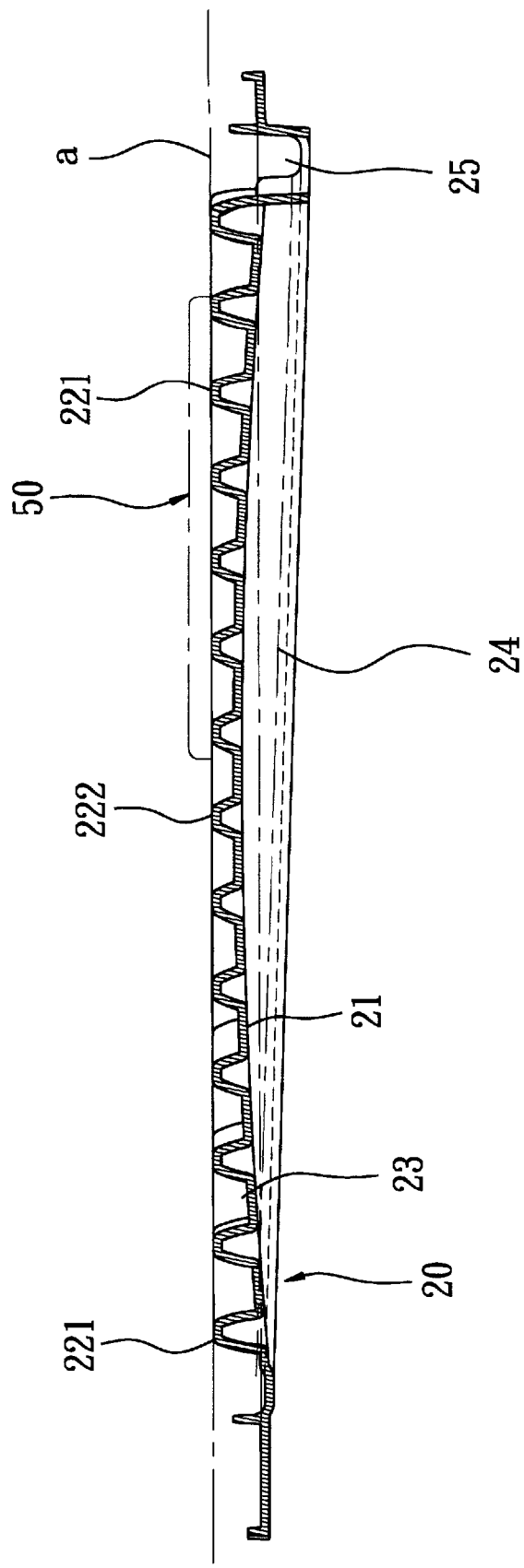
FIG. 6 is a cross-sectional view of the grill device shown in FIG. 4, taken along lines VI—VI thereof.

As shown in FIGS. 3, 4 and 6, when meat 50 is disposed on the first and second ridge portions 222,221 in the cooking chamber 60 for grilling, oil dripping from the upper major wall 211 of the lower cooking member 21 will flow to the annular fluid collecting groove 24 via channels 23 which are formed between two adjacent ones of the first and second ridge portions 222,221 since the upper major wall 211 is gradually reduced in height from the central line to the annular fluid collecting groove 24.

When the upper cooking plate portion 11 is moved to an open position relative to the lower cooking member 21, referring to FIG. 6, thin meat 50 may be disposed on the first and second ridge portions 222,221 for grilling, and can be held in position since the first and second ridge portions 222,221 are of the same height, i.e. parallel to a horizontal plane (a).

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:
1. A grill device adapted to be placed on a flat support, comprising:
   an annular bottom wall adapted to be placed above the flat support, and including first outer and inner annular peripheries opposed to each other and surrounding a central line;
   an outer annular wall extending uprightly from said first outer annular periphery and in a transverse direction to form an outer upper annular edge distal to said first outer annular periphery and with a first height;
   an inner annular wall extending uprightly from said first inner annular periphery and in the transverse direction to form an inner upper annular edge distal to said first inner annular periphery and with a second height which is lower than the first height, said inner annular wall, said outer annular wall and said annular bottom wall confining an annular fluid collecting groove there among;
   a lower cooking member including upper and lower major walls normal to the central line and opposite to each other in the transverse direction, said upper major wall including an outer circumferential area which surrounds the central line and which is integrally formed with and which extends inwardly and towards the central line from said upper inner annular edge to form an inner annular boundary line that is proximate to and that surrounds the central line, and a central area which is disposed to have the central line passing therethrough, which is normal to the central line, and which includes an outer annular boundary line that is distal to the central line and that is coincident with said inner annular boundary line, said central area being raised so as to be higher than said outer circumferential area, said lower major wall being punched upwardly and in the transverse direction to form a plurality of first and second ridge portions respectively in said central and outer circumferential areas, said first and second ridge portions being of such heights in the transverse direction so that along a respective one of a plurality of radial directions, said respective one of said first ridge portions is not higher than said respective one of said second ridge portions; and
   an upper cooking member disposed to be hinged to said lower cooking member so as to cover and be superimposed on said lower cooking member.

2. The grill device as claimed in claim 1, wherein said upper major wall of said lower cooking member is gradually raised from said upper inner annular edge to the central line.

3. The grill device as claimed in claim 2, wherein said first and second ridge portions are of the same height in the transverse direction.

4. The grill device as claimed in claim 1, wherein said annular bottom wall further has a drainage hole formed therein and in fluid communication with said annular fluid collecting groove, and adapted to permit liquid flow therethrough.

5. The grill device as claimed in claim 1, wherein said upper cooking member has an upper cooking plate portion disposed therein and movable relative to said lower cooking member to define a cooking chamber therebetween, and a plurality of rib portions that cooperate with said first and second ridge portions to position food on said grill device.

* * * * *